United States Patent
Zeidler et al.

(10) Patent No.: US 10,581,731 B2
(45) Date of Patent: Mar. 3, 2020

(54) METHOD AND SYSTEM FOR TRANSMITTING CONTROL COMMANDS FOR UNITS IN A DISTRIBUTED ARRANGEMENT

(71) Applicant: ZUMTOBEL LIGHTING GMBH, Dornbirn (AT)

(72) Inventors: Gerd Zeidler, Hörbranz (AT); Nuno Lourenco, Hörbranz (AT)

(73) Assignee: ZUMTOBEL LIGHTING GMBH, Dornbirn (AT)

( * ) Notice: Subject to any disclaimer, the term of this patent is extended or adjusted under 35 U.S.C. 154(b) by 180 days.

(21) Appl. No.: 15/564,459

(22) PCT Filed: Apr. 28, 2016

(86) PCT No.: PCT/EP2016/059492
§ 371 (c)(1),
(2) Date: Oct. 5, 2017

(87) PCT Pub. No.: WO2016/174139
PCT Pub. Date: Nov. 3, 2016

(65) Prior Publication Data
US 2018/0083869 A1    Mar. 22, 2018

(30) Foreign Application Priority Data
Apr. 30, 2015  (DE) .............. 10 2015 207 985

(51) Int. Cl.
*H05B 37/02*     (2006.01)
*H04L 12/721*    (2013.01)

(52) U.S. Cl.
CPC ........... *H04L 45/44* (2013.01); *H05B 37/029* (2013.01); *H05B 37/0218* (2013.01);
(Continued)

(58) Field of Classification Search
CPC .. H05B 37/0245; H05B 37/0281; H04L 45/44
See application file for complete search history.

(56) References Cited

U.S. PATENT DOCUMENTS 8,391,270 B2 *  3/2013  Van Der Stok ....... H04J 3/0638
                                                            370/350
9,119,142 B2 *  8/2015  Espina Perez ......... H04L 1/188
(Continued)

FOREIGN PATENT DOCUMENTS

CN        101682443       3/2010
EP        2440017         4/2012
(Continued)

OTHER PUBLICATIONS

Austria search report dated Mar. 5, 2019 in co-pending Austria Patent Application GM 186/2015.
(Continued)

*Primary Examiner* — Tung X Le
*Assistant Examiner* — Borna Alaeddini
(74) *Attorney, Agent, or Firm* — Andrus Intellectual Property Law

(57) ABSTRACT

A method for transmitting control commands in a system (100) of units (L1-L18) in a distributed arrangement, for example in a lighting system having luminaires in a distributed arrangement, involves at least some of the units (L1-L18) sending a received control command again in order to ensure that the control command is forwarded to all units (L1-L18). The control command contains a piece of information regarding an already past command transmission time, wherein each unit (L1-L18) takes the command transmission time that a received command contains as a basis for determining an individual waiting time ($TTL_{ind}$), after the expiry of which the command is executed by the unit (L1-L18).

18 Claims, 3 Drawing Sheets

(52) U.S. Cl.
CPC ..... *H05B 37/0272* (2013.01); *H05B 37/0281* (2013.01); *Y02B 20/42* (2013.01)

(56) References Cited

U.S. PATENT DOCUMENTS

| | | | |
|---|---|---|---|
| 2006/0009927 A1* | 1/2006 | Osterloh | G08C 17/02 702/46 |
| 2006/0126617 A1 | 6/2006 | Cregg et al. | |
| 2007/0184864 A1 | 8/2007 | Leitch et al. | |
| 2010/0008351 A1* | 1/2010 | Ashwood-Smith | H04J 3/0661 370/350 |
| 2011/0305200 A1* | 12/2011 | Schoofs | H05B 37/0245 370/328 |
| 2013/0188562 A1* | 7/2013 | Espina Perez | H04L 1/188 370/328 |
| 2018/0083799 A1* | 3/2018 | Draaijer | H04W 84/18 |

FOREIGN PATENT DOCUMENTS

| | | |
|---|---|---|
| JP | 2001093675 | 6/2001 |
| WO | 2005091573 | 9/2005 |
| WO | 2008152554 | 12/2008 |

OTHER PUBLICATIONS

China search report in co-pending China patent application 2016800225248 dated Feb. 18, 2019.
German search report dated Oct. 15, 2015 in pending German Application 10 2015 207 985.6.
PCT search report dated Jul. 4, 2016 in parent PCT Application PCT/EP2016/059492.

\* cited by examiner

| Transmitter ↓ / Receiver → | sw1 | ... | L1 | ... | L13 | ... | L18 |
|---|---|---|---|---|---|---|---|
| sw1 | 0 | ... | 0 | ... | 5 | | 2 |
| ... | ... | 0 | ... | ... | ... | ... | ... |
| L1 | 0 | ... | 0 | ... | 5 | ... | 2 |
| ... | ... | ... | ... | 0 | ... | ... | ... |
| L13 | 4 | ... | 5 | ... | 0 | ... | 0 |
| ... | ... | ... | ... | ... | ... | 0 | ... |
| L18 | 3 | ... | 3 | ... | 0 | ... | 0 |

Fig. 4

METHOD AND SYSTEM FOR TRANSMITTING CONTROL COMMANDS FOR UNITS IN A DISTRIBUTED ARRANGEMENT

The present application is the U.S. national stage application of International Application PCT/EP2016/059492, filed Apr. 28, 2016, which international application was published on Nov. 3, 2016 as International Publication WO 2016/174139 A1. The International Application claims priority to German Patent Application 10 2015 207 985.6 filed Apr. 30, 2015.

FIELD OF THE INVENTION

The present invention relates to a method for transmitting control commands in a system of units in a distributed arrangement, e.g. in a lighting system having lamps in a distributed arrangement. Furthermore, the invention relates to a corresponding system having units in a distributed arrangement, wherein, through the use of the invention, a temporally synchronized performance of all of the units is sought when executing control commands.

BACKGROUND OF THE INVENTION

Larger lighting systems, in which numerous lamps are activated by a central control device, have the advantage, in comparison with locally activated individual lamps, that a coordinated performance of all the lights can be more easily and efficiently obtained. This means, e.g., that all of the lamps are collectively activated in a predefined time period, e.g. during normal work and business hours, and their respective brightness is adjusted such that on the whole, a homogenous lighting is obtained. Such a performance of the lights in relation to one another is desirable in public buildings or larger spaces, e.g. open-plan offices or factories, because this results in a significantly more pleasant impression.

One of the problems known with such systems is that, with regard to the light output, it is relatively simple to obtain a coordinated performance of the lamps, whereas a temporally synchronized performance of the lamps is much more difficult to achieve. The reason for this is that the lamps do not normally change their performance automatically at specific predefined points in time, but rather, a control command is issued by a single primary control device, which is received by all of the lamps, and is to be implemented accordingly. The transmission of this control command to all of the lamps of the system requires, however, more or less time, depending on the positions of the lamps. This is because normally, the original command issued by the control device does not reach all of the lamps, but instead, is repeated by some of the units in the system, thus re-issued, such that it propagates in a cascading manner over the entire system, until it has been received by all of the lamps. The receiving and resending of the control command requires some time, however, such that lamps, for example, that first receive the command after the third repetition, react significantly later than those lamps that have received the control command issued by the primary control device directly. This may then make it noticeable, for example, that following a centrally issued command to switch the lamps on, those at an increasing distance to the control device are first activated successively, which is clearly visible to an observer.

The problems described above also exist independently of whether the control commands are transmitted via a signal line or in a wireless manner, e.g. by radio or infrared radiation, because in both cases, the control command must be resent, in particular with large systems, in order to be able to propagate over the entire system. These problems are also not specific to lighting systems, but instead, also pertain to other systems that have loads in a distributed arrangement, with which it is desired that the loads react substantially simultaneously to a control command.

The present invention therefore addresses the object of avoiding the disadvantages described above in systems of loads or units in a distributed arrangement, and to optimize the temporally coordinated performance of the units after a central control command has been issued.

The object is achieved by a method for transmitting control as described herein, and also by a system of units in a distributed arrangement as described herein.

SUMMARY OF THE INVENTION

The central idea for the solution according to the invention is that a unit that has received a control command does not necessarily implement it immediately. Instead, it is provided that the control command contains a datum regarding a prior command transmission time, and each unit determines an individual waiting time on the basis of this command transmission time, after which the command is first executed by the unit.

According to the invention, a method is thus disclosed for transmitting control commands in a system of units in a distributed arrangement, e.g. in a lighting system having lamps in a distributed arrangement, wherein at least a portion of the units resend a received control command, in order to ensure a forwarding of the control command to all of the units, wherein the control command contains a datum regarding a prior command transmission time, and wherein each unit determines an individual waiting time on the basis of the command transmission time contained in a received command, after which the command is executed by the unit.

The lamps that receive directly, e.g., the control command issued by the primary control device thus do not execute the command immediately, but instead, first wait for a specific period of time, before the command is implemented. This waiting period can be determined on the basis of the command transmission time contained in the command, such that the command is first implemented when it has actually been received by all of the participants in the system. As a result, it is ensured that all of the lamps, or in general, all of the units of the system, react substantially simultaneously, and a cascading activation of the lamps is thus prevented. The approach according to the invention must not necessarily result in a 100% synchronized performance of all of the units of the system, but the deviations are nevertheless small enough that they are hardly noticeable to an observer. This applies to the critical case of lighting control, in which temporal deviations can be observed particularly easily.

In order to place the participants of the system in a position in which they can each determine an individual waiting period, the units must thus know how much time has elapsed since the original control command was issued. This is ensured in accordance with a preferred embodiment of the invention, in that each unit that resends a received control command adds a delay time, taking the reception and forwarding into account, to the command transmission time contained in the control command, and the control command is then resent with the updated command transmission time obtained thereby. Each unit that resends a received control command in the manner described above then preferably determines its individual waiting period after the resending of the control command, based on this updated command transmission time.

Each unit that forwards a command thus knows how much time is required for the reception and forwarding of the command signal. This is then added to the command transmission time contained in the received command, and output as a newly updated value. Because the signal runtime itself, in comparison to the time required for the reception and resending of the control command, is negligible, the command transmission time thus primarily represents a combination of the times required by the units responsible for the signal transmission for the reception, processing and forwarding of the signal. This approximation is fully sufficient for the intended effect, specifically a theoretically simultaneous performance, for an observer, of all of the units of the system.

The calculation of the individual waiting times by each unit can then take place in that the difference between a global transmission period for the control command and the command transmission time contained in the command is determined. I.e. all of the units know a global transmission period that provides information as to the period of time within which all of the units of the system actually receive the command. Because the units furthermore know how much time has elapsed since the original control command was issued, due to the command transmission time contained in the command, they can then determine, in a simple manner, how long they still have to wait before executing the command.

It may be provided that the global transmission period depends on the starting point of the control command, and is determined on a one-time basis at the start-up of the system. This is the simplest variation, and requires that the global transmission period must be coordinated to an extreme case, in which the control command is issued at one end of the system, and must work through the entire arrangement of units to the other end, such that the maximum delay time is required for the full propagation of the control command. Because this would mean, however, that if the command is issued from a more central position, and thus propagates significantly more quickly, the units wait for an unnecessarily long period of time before they synchronously implement the command, it can also be provided according to a particularly preferred embodiment that the global transmission period is determined as a function of the starting point of the control command.

This can take place, for example, in that the control device that initially issues the control command also adds a datum regarding the global transmission period. In this case, each control device of the system that theoretically initially issues a control command must thus know how much time elapses before the command has been fully propagated in the system. Alternatively, it can also be provided that a datum is added to the control command that only provides information regarding which control device initially issued the control command. In this case, each unit must then independently determine the resulting global transmission period. In both cases, it is necessary for the data to be determined at least at the initial start-up of the system, and is ideally also, optionally, updated during later operating periods, because changes in the system itself, or in the area or building in which the system has been installed, may be accompanied with effects on the manner in which the command is propagated.

It can be derived from the above that the method according to the invention is first based on the concept of adding temporal data to the transmitted command, and then calculating waiting times based thereon. It is provided according to a particularly preferred embodiment of the invention, that the definition or calculation of the transmission time, the waiting time, and, if applicable, the global transmission period, takes place not on the basis of precise time values, but instead in discrete time periods or time units. As a result, the transmission of these times and the calculation of the times is clearly feasible, and can be executed more easily and quickly, and if applicable, data regarding the resulting global transmission period can be stored with little effort. As shall be explained below based on the description of the figures, this only results in low losses regarding the synchronized performance of the units, such that nevertheless, in comparison with methods known from the prior art, clear advantages can be obtained.

Lastly, it is ensured with the use of the approach according to the invention that, despite more complex signal propagation, the units of the system react simultaneously, in the view of an observer, independently of the size of the system.

BRIEF DESCRIPTION OF THE DRAWINGS

The invention shall be explained below in greater detail, based on the attached drawings. Therein:

FIG. 4 shows an example of a matrix for storing the transmission times.

DETAILED DESCRIPTION

The invention shall be explained in greater detail below based on a lighting system in which the control commands are transmitted wirelessly—e.g. by radio or infrared—to lamps of the system in a distributed arrangement. As specified above, however, the present invention is not limited to lighting systems, even though temporal deviations in the activation of the units of the system can be most easily observed here. It may also be the case that a synchronized performance of the various units in other systems is desired, e.g. in a system for central activation of shading systems such as blinds or the like, for which reason, the invention can be used in a very versatile manner.

Furthermore, the approach according to the invention can be applied in a simple manner to systems in which the signal transmission is not wireless, but instead takes place via physical lines. This may be the case, in particular, when there are complex bus systems, in which numerous different subsystems are interconnected, and accordingly, a repeating of the control command must necessarily take place at the interfaces.

Figure 1:
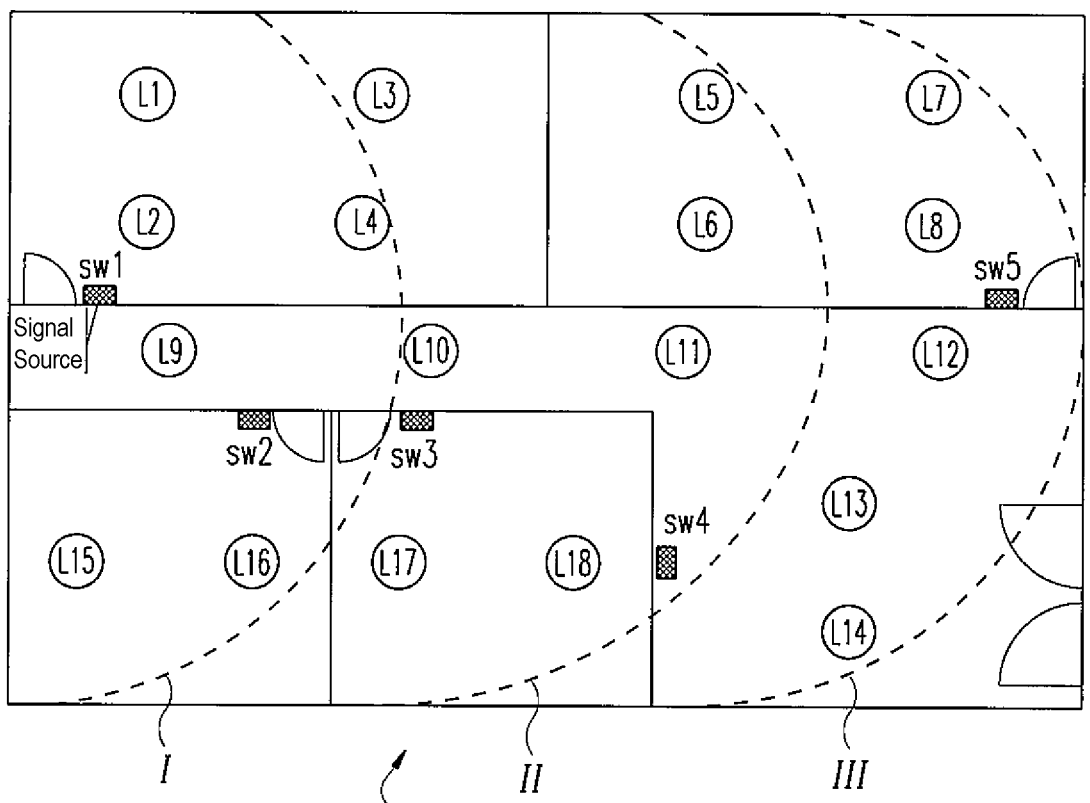
FIG. 1 shows schematically, the propagation of a control command in a larger lighting system.

FIG. 1 shows, schematically, in this context, a floorplan of a building in which a lighting system, indicated as a whole with the reference number 100, is employed. In the depicted exemplary embodiment, the lighting system 100 has numerous switches or sensors sw1 to sw5 in a distributed arrangement, as well as numerous lamps L1 to L18 in a distributed arrangement. As can be seen, the various switches or sensors sw1 to sw5 and lamps L1 to L18 are not all disposed in the same room, but instead, can also be disposed in rooms and hallways separated from one another by walls. Nevertheless, it is desired that when a control command is issued, pertaining to all of the lamps L1 to L18, the lamps L1 to L18 implement this command as simultaneously as possible.

It should be noted that in the present case, it is only intended with the invention that the lamps L1 to L18 perform in a temporally synchronous manner, thus executing, for example, a global control command simultaneously. It is not important, in contrast, how the command is then actually implemented by the lamps L1 to L18. This means that it may be the case that a command causes some lights to emit a light having a maximum brightness, while other lamps, located, for example, in the proximity of building windows, assume a reduced brightness, taking into account the daylight entering from outside. It is desired, however, that the lamps L1 to L18 substantially simultaneously change to the brightness required by the control command, independently of the brightness they ultimately assume, wherein "simultaneous" in this case understood to mean that deviations are small enough that they will not be noticed by a human observer. Furthermore, the invention does not exclude the possibility that a command pertains to only some, or a portion of the lamps, wherein ideally those lamps that are addressed collectively by a command will always react simultaneously.

In the present case, it is assumed that a control command is initially issued by the switch sw1, which causes all of the lamps L1 to L18 to switch on. In the same manner, the primary control command could however also be issued from one of the lamps L1 to L18, e.g. because this lamp wants to assume a new operating state due to a change in the situation (e.g. a change in the daylight entering from outside, or an emergency situation), and the other lamps of the system 100 should perform in turn in the same manner. Thus, in the present case, both the switches or sensors sw1 to sw5, as well as the lamps L1 to L18, are regarded as units of the system according to the invention.

In the depicted exemplary embodiment it is thus assumed—as specified above—that first the control command is primarily transmitted wirelessly by the switch sw1. The range of the signal issued by this switch sw1 is limited, however, which can be attributed, for example, to the different walls of the building, through which the signal can only pass in a very weakened form. In the same manner, in a hard-wired signal transmission, the range can be limited, for example, in that numerous subsystems exist, and the primary control device can only transmit signals within a subsystem.

In the present case, the range of the signal issued by the switch sw1, which contains the control command, is depicted by the first broken-lined curve I, which is such that, as can be seen, only the lamps L1, L2, L4, L9, L15 and L16, and the switch/sensor sw2, receive the signal. In this context, for purposes of simplicity, it is assumed that a signal is received by the units of the system 100, either entirely/correctly, or not at all. As a matter of course, intermediate states may arise in reality, such that, by way of example, a signal is only partially received, or received with a lower intensity, such that it is not recognized with sufficient reliability. Such intermediate states shall be regarded below as signals that have not been received, for purposes of simplicity.

This means, therefore, that the control command originally issued by the switch sw1 is only received by a portion of the lamps of the system 100. Because, however, it is intended that all of the lamps implement this command, it is provided that—as already known for some time from the prior art—the control command that has been received will be re-transmitted by at least some of the lamps. This signal repetition then has a new range (curve II) and results in the control command being received by the lamps L3, L5, L6, L10, L11, L17, and L18 as well (as well as by the switches sw3 and sw4). This approach is then continued in the same manner. This means that one of the lamps that received the first signal repetition resends the signal in turn—with the range III—such that it is then received in the next step by the lamps L7, L8, L12, L13 and L14, and the switch sw5. In the depicted exemplary embodiment, the control command is thus received by all of the units of the system 100, wherein in reality, however, significantly more signal repetitions may be necessary before the command ultimately reaches all of the units.

In solutions known from the prior art, the lamps have so far been configured such that after receiving a control command they implement it as quickly as possible, i.e. in the present example, they switch on. As a result, the activation of all of the lamps in the system 100 takes place in the manner of a cascade in three successive stages, depending on the respective signal ranges I, II, III of the originally issued control command, or the repeated control commands. The resulting time differences are less due to the signal propagating at light speed than to the processes that must be carried out in the lamps responsible for the signal repetition pertaining to the reception, processing and re-transmission of the signal. The processes lead to delays, which eventually lead to a successive activation of the lamp groups, which can be clearly seen by an observer.

In the past, it was attempted to keep these delay times as small as possible in order to reduce such effects. Because, however, the processes for processing and resending the signals cannot be arbitrarily shortened, this does not result in entirely convincing solutions. The present invention proposes a novel approach in this regard, with which the problems described above can be avoided in an elegant and efficient manner.

Simply stated, the method according to the invention provides that the lamps of the lighting system 100 wait after receiving a control command, until it has been ensured that the last lamps of the system 100 have receive the command, and can implement it. The lamps then first carry out the command at this point in time, more or less simultaneously, wherein the remaining time differences are small enough that they are no longer noticeable to a human observer.

Figure 2:
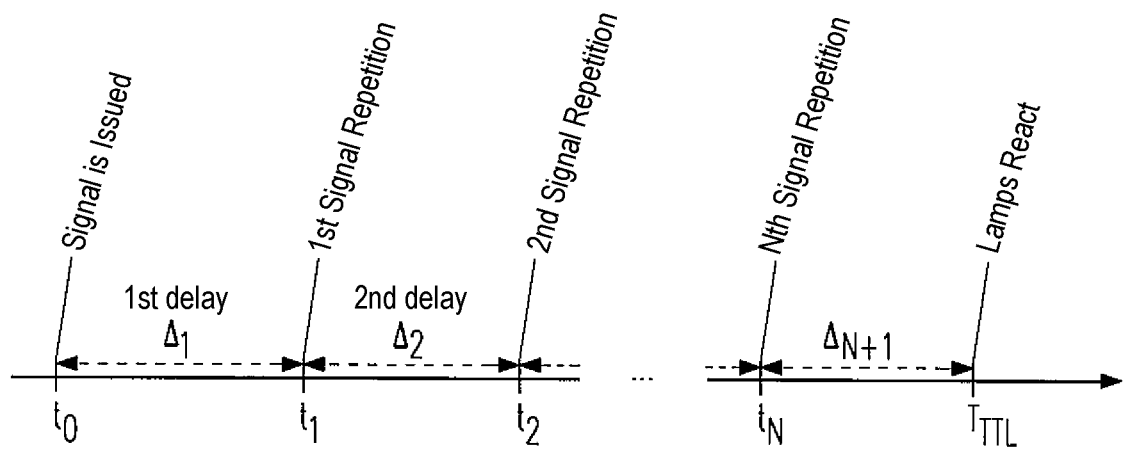
FIG. 2 shows the temporal course of the propagation of the signal until it is implemented by the lamps of the system shown in FIG. 1.

The principle according to the invention shall be explained simply, based on FIG. 2. The temporal course, from the original transmission of the control command to its implementation, is shown therein.

Thus, the initial signal output takes place at the point in time $t_0$, wherein the signal is repeated for the first time by a unit of the system at time $t_1$. In the time period between the points in time $t_0$ and $t_1$, having a duration $\Delta_1$ (specifically at the start of this time period), all of the lamps that are within the signal range of the primary control device, thus within the range of the switch sw1 in the example described above, receive the control command. These include, e.g., the unit responsible for resending the signal at the time $t_1$. The delay period $\Delta_1$ is obtained in particular from the steps in this unit that are necessary for receiving, processing and transmitting the signal.

In the subsequent delay period $\Delta_2$, those lamps located in the signal range of the lamp first repeating the signal receive the command. A second repetition of the control command by at least one of these lamps takes place at the time $t_2$. This process is repeated until the point in time $t_N$, at which the signal or control command is repeated for the $N^{th}$ time. This signal is then received by the last remaining lamps of the system, and these are then able to carry out the command, after a final delay period $\Delta_{N+1}$—required by the lamps for evaluating the command, and preparing to carry it out—at the time $T_{TTL}$ (wherein the abbreviation TTL stands for Time-To-Light).

It is then provided according to the invention, that all of the participants in the system know the time $T_{TTL}$, and the command is first carried out at this point in time, independently of the point in time at which the individual lamps have actually received the command. This means that all of the lamps wait collectively until the time $T_{TTL}$, and then execute the command collectively, and synchronously.

In order for each lamp to be able to determine individually how long it must wait until executing the received command, two conditions must be fulfilled.

On one hand, the lamps must know the overall time period $T_{TTL}$, which shall also be referred to below as the global transmission period, and indicates how long it takes after issuing the original signal for all of the participants of the system to receive the command, and to be capable of implementing it.

On the other hand, each lamp must know when it receives the signal, how much time has elapsed since the original transmission of the signal.

In this context, it would be conceivable to assume in a first step that the delays for the signal repetition, thus the time periods $\Delta_1$ to $\Delta_N$ are each the same length. This requires, however, that all of the participants of the system are identical in terms of the components responsible for receiving and forwarding the signal, and thus actually require the same amount of time for this. Because, however, the system according to the invention should be a flexible as possible, and in particular when different types of lamps are used having different associated electronics, should nevertheless ensure that they function synchronously, it must be assumed that the delay times are actually dependent on which lamps, or in general, which participants of the system, repeat a signal.

In order to be able to account for this, it is provided according to the invention that with the transmission and repetition of the control command, they are actually supplemented with a datum regarding the command transmission time that has already elapsed, and this datum is updated accordingly by the lamps that repeat a command. Each lamp that receives a command can thus determine how much time has elapsed, based on the command transmission time contained in the command. Based on this information, and the knowledge regarding the global command transmission time, each lamp can determine individually how long it must wait before it actually executes the command.

The approach shall be explained below in greater detail, based on FIG. 3, which relates to the scenario shown in FIG. 1, in which the control command is originally issued at the time $t_0$ by the switch sw1. Furthermore, the signal is repeated at the time $t_1$ by the lamp L2, and at the time $t_2$ by the lamp L17, wherein all of the lamps of the system 100 have received the command after the second signal repetition.

It should be noted here that preferably, for practical reasons, the definition or calculation of the command transmission time, the waiting time, and the global transmission period, is not in absolute times, e.g. milliseconds or microseconds, but rather, a standardized definition in discrete time steps takes place. The advantage with this approach is that all of the time values are given in natural, whole numbers, and can accordingly be easily integrated in the signal. The effort for transmitting and calculating absolute time values would be much more difficult.

These discrete time steps are standardized to slot values $t_{slot}$, wherein this time step $t_{slot}$ should at most correspond to the shortest delay time for a signal repetition, and ideally is even shorter. The delay time $\Delta_n$ resulting from the signal repetition by a specific participant of the system is then given in the method according to the invention in whole number values, which indicate the hop counts hc, calculated as follows:

$$hc_n = \Delta_n / t_{slot}$$

These delay times are then added to the control command, as specified above, and make it possible for the lamps to determine individually how long they have to wait before executing the received control command, as shall be explained in greater detail below.

Figure 3:
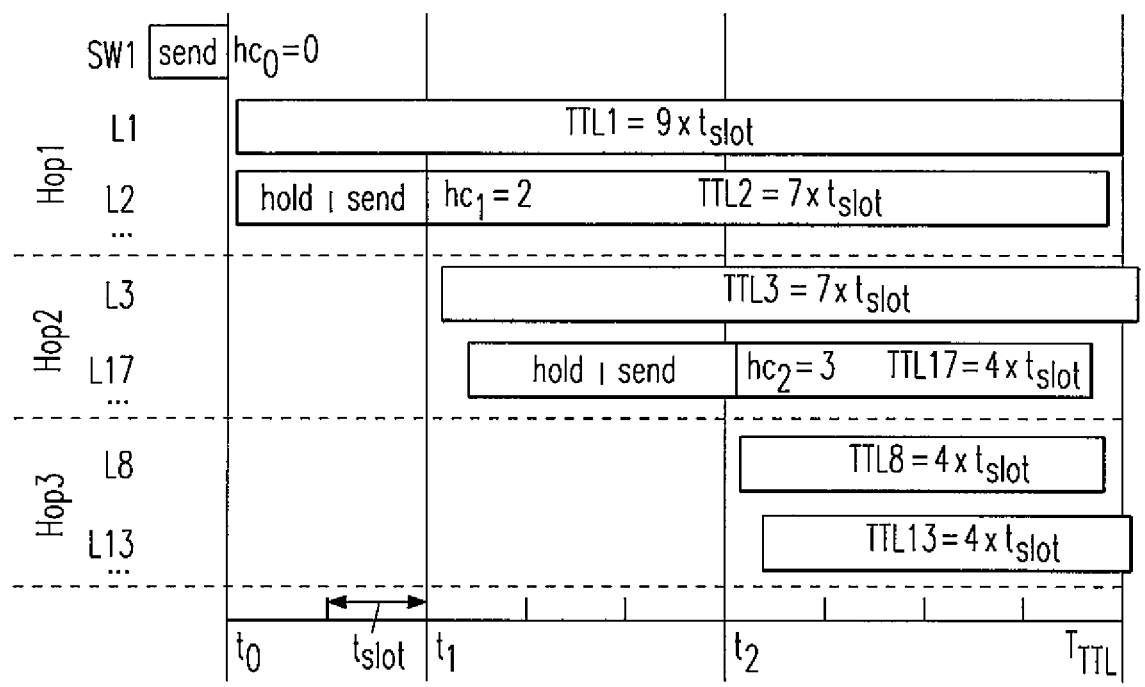
FIG. 3 shows a schematic depiction for illustrating the performance according to the invention of the various lamps of the system shown in FIG. 1.

In the exemplary embodiment depicted in FIGS. 1 and 3, this means that first, the overall delay time $T_{TTL}$ is known to lamps, which has been standardized such that it now amounts to 9 hop counts. If the control command is initially issued at the time $t_0$ by the switch sw1, then a datum regarding the already elapsed signal transmission time is added to this command, as specified above, which, however, is 0 in the initial output of the signal. The hop count value hc added to the control command thus equals 0.

This signal, output by the switch sw1—as shown in FIG. 3—is received by the lamp L1, for example, wherein the signal reception takes place almost immediately, such that the lamp L1 receives the signal shortly after the time $t_0$. Based on the number of hop counts hc contained in the signal—which is 0 here—and the known global transmission period $T_{TTL}=9$, the lamp L1 then calculates an individual delay time TTL1, corresponding to the difference between the global transmission period $T_{TTL}$ and the already elapsed signal transmission time, thus 9. In absolute time values, the lamp L1 thus waits for a period TTL1 that is 9 times the discrete time value $t_{slot}$.

Like the lamp L1, the lamp L2 also receives the primary signal issued by the switch sw1, having a hop count hc=0, immediately after the time $t_0$. The lamp L2, however, is responsible for the signal repetition, which means that it receives the signal, processes it, and resends it at the time $t_1$. For this, the lamp L2 requires an individual delay time $hc_1=2$, and adds the repeated control command accordingly to an updated hop count value hc=2. After issuing the command, the lamp L2 calculates a delay time TTL2 starting at the issuing of the command, which in turn is the difference between the global transmission period and the signal delay time, and is then 7.

For the other lamps that receive the primary signal immediately, i.e. lamps L4, L9, L15, and L16, the same applies as for the lamp L1. These lamps also receive the primary signal with the hop count value of 0, and calculate a delay time accordingly, equal to 9.

The lamp L3, in contrast, receives the signal repeated by the lamp L2, with the updated hop count value 2. After receiving this signal, the lamp L3 calculates in turn an individual delay time in a manner analogous to that for the lamps discussed above. Thus, as with the lamp L2, which first calculated its delay time after issuing the repeated signal, a delay time having a value of 7 is likewise obtained. The same applies for the lamps L5, L6, L10, L11 and L18.

The approach with the lamp L17 responsible for the second signal repetition is analogous to the approach with the lamp L2, wherein the lamp L17 requires a longer time $hc_2=3$ for the signal repetition. The value 3 is then added to the signal delay time, such that an updated delay time $hc=2+3=5$ is obtained, which is added to the signal issued at the time $t_2$. After issuing the signal, the lamp L17 then calculates an individual delay time of 4.

The lamps of the third group, all of which receive the signal repeated a second time, then calculate an individual delay time 4, based on the updated signal delay time $hc=5$.

In general, it is the case that the signal transmission time hc added to the command corresponds to the sum of the delay times $hc_i$ resulting from the prior signal repetitions, and is calculated, accordingly, as follows:

$$hc = \sum_{i=0}^{i=n} hc_i$$

For the individual delay times $TTL_{ind}$, the following applies, respectively:

$$TTL_{ind} = T_{TTL} - hc$$

$$TTL_{ind} = T_{TTL} - \sum_{i=0}^{i=n} hc_i$$

Each lamp then executes the command after the individually determined delay times have elapsed, wherein it can be seen clearly in FIG. 3 that the execution of the command substantially takes place simultaneously. There are only slight deviations, resulting from the slightly different signal runtimes, wherein these deviations lie clearly shorter than a single time slot, and are thus slight, such that they cannot be seen by a human observer. Ultimately, in the view of an observer, all of the lamps react simultaneously.

The approach according to the invention thus results, in a simple manner, in the lamps of the system 100 actually implementing commands, in the view of an observer, synchronously, even if the command transmission takes place in the framework of numerous repetitions. It is assumed in the explanation above, for reasons of simplicity, that the repetition of a signal only takes place each time in a single lamp. The approach according to the invention could also be used when all of the lamps within the transmission range of the primary transmitter—switch sw1 here—carry out a repetition. It must only be determined then, that each lamp can only repeat a signal once, and after calculating its individual waiting time, ignores any further signal repetitions that are received. The lamps thus do not have to engage in any complicated agreements regarding which lamp is responsible for the respective signal repetition, but instead, can act in accordance with a predefined, but easily executed plan.

Another advantage of the approach according to the invention is that the lamps themselves can calculate their individual delay times in a relatively simple manner, because only the difference between the global transmission period and the already elapsed transmission time needs to be calculated. Thus, if the global transmission period is known, then the effort required for calculating the individual delay time is extremely small. There are numerous possibilities for determining the global transmission period, which shall be explained in greater detail below.

A first possibility would be to define a permanent, fixed global transmission period. This must then be measured, such that the maximum time for the transmission period of a signal from an arbitrary primary control device to all of the lamps is accounted for. This is the case with the example in FIG. 1, in which the signal is propagated from one end of the building, continuously over the entire length to the other end.

If instead, the primary signal is issued from the switch sw3 in the system shown in FIG. 1, it can be assumed that the command is propagated more quickly over the entire system, because it is then distributed in two opposing directions, and at most, only one further signal repetition is required. In this case, the global transmission time $T_{TTL}=9$ would be too high, and as a result, all of the lamps would have to wait needlessly long before they could then ultimately implement the command synchronously, as desired. It would thus be advantageous in this case, or in general, to select a shorter global transmission period, which depends on the starting point of the primary signal. Two variations are conceivable for this.

On one hand, the unit that initially transmits the command can simultaneously determine the global transmission period as well, and likewise add this information to the control command.

Alternatively, a datum could also be added to the control command, that provides information regarding which unit was the source of the control command. Based on this information, each lamp can then determine the global transmission period resulting therefrom, and then calculate the individual waiting time, taking the command transmission time into account.

It is necessary with the variations, that there is knowledge regarding how long the transmission of a signal, starting from an arbitrary control device, requires to reach an arbitrary receiver in the system. This information must be present, or determined, at least at the start-up of the system, and is then stored in a matrix, as is shown schematically in FIG. 4. The content of a field of the matrix indicates the signal runtime (in turn, in timeslot values) between the control devices listed in the rows, and the receivers listed in the columns. The diagonal of the matrix remains, logically enough, empty, or contains values of 0, because the signal runtime from one participant of the system to itself is always 0. If, however, a primary signal is output by a specific participant in the system, the maximum value of the entry contained in the corresponding row enables a determination of the global transmission period.

The knowledge of this maximum entry makes it possible either for the source point of the signal, thus the primary control device, to add the global transmission period directly to the control command, or for each lamp that knows the source of the signal to determine the global transmission period. It is also advantageous here that the signal runtimes are given in discrete, whole number values, because this reduces the effort required for storing them in the matrix. Moreover, compression algorithms known from the prior art can also be implemented, in order to further reduce the storage requirements.

The signal runtimes and thus the contents of the matrix must be determined at the start-up of the system, as stated above. It is preferably provided that furthermore, an updating of the matrix entries takes place during the operation of the system as well, at least at regular intervals, because changes, not only in the system itself, but also caused by external influences, could lead to changes regarding the signal runtimes. By way of example, the addition of walls or furniture in the building may lead to a signal propagating along significantly different pathways, and thus more quickly or slowly.

Ultimately, however, the measures described above result in the performances of the various participants in the system being able to be clearly better coordinated to one another, and thus, the overall appearance of the lighting in a lighting system, for example, can be significantly improved. As specified above, a particular advantage of the approach according to the invention is that the effort for implementing the method is relatively low.

What is claimed is:

1. A method for transmitting control commands in a system of units in a distributed arrangement wherein at least a portion of the units resends a received control command, in order to ensure a forwarding of the control command to all of the units, wherein the control command contains a datum regarding a previously elapsed command transmission time, and wherein each unit determines an individual waiting time ($TTL_{ind}$) based on the command transmission time contained in the control command, after which the command is executed by the unit, and further wherein the individual waiting time ($TTL_{ind}$) is determined by calculating the difference between a global transmission period ($T_{TTL}$) and the command transmission time.

2. The method according to claim 1, wherein each unit that resends a received control command adds a delay time, which accounts for the reception and forwarding, to the command transmission time contained in the control command, and resends the control command with the updated command transmission time obtained thereby.

3. The method according to claim 2, wherein each unit that resends a received control command determines its individual waiting time ($TTL_{ind}$) after resending the control command based on the updated command transmission time.

4. The method according to claim 1, wherein the global transmission period ($T_{TTL}$) is independent of the starting point of the control command.

5. The method according to claim 1, wherein the global transmission period ($T_{TTL}$) is dependent on the starting point of the control command.

6. The method according to claim 5, wherein one of the units is a control device that initially issues the control command, and the global transmission period ($T_{TTL}$) is added to the control command by the control device that initially issues the control command.

7. The method according to claim 5, wherein one of the units is a control device that initially issues the control command, the global transmission period is determined independently by each unit, based on a datum contained in the control command, which provides information regarding which control device initially issued the control command.

8. The method according to claim 1 wherein a calculation of the command transmission time, the individual waiting time, and the global transmission period, takes place in discrete time steps.

9. A system having units in a distributed arrangement wherein after one of the units issues a control command, at least a portion of the units resends the received control command, in order to ensure a forwarding of the control command to all of the units, wherein resent control commands contain a datum regarding a previously elapsed command transmission time, and wherein each unit determines an individual waiting time ($TTL_{ind}$) based on the command transmission time contained in the received control command, after which the command is executed by the unit, and further wherein the individual waiting time ($TTL_{ind}$) is determined by calculating the difference between a global transmission period ($T_{TTL}$) and the command transmission time.

10. The system according to claim 9, wherein each unit that resends the received control command adds a delay time, which accounts for the reception and forwarding, to the command transmission time contained in the control command, and resends the control command with the updated command transmission time obtained thereby.

11. The system according to claim 10, wherein each unit that resends the received control command determines its individual waiting time ($TTL_{ind}$) after resending the control command, based on the updated command transmission time.

12. The system according to claim 9, wherein the global transmission period ($T_{TTL}$) is independent of the starting point of the control command.

13. The system according to claim 9, wherein the global transmission period ($T_{TTL}$) is dependent on the starting point of the control command.

14. The system according to claim 13, wherein the global transmission period ($T_{TTL}$) is added to the control command by the control device that first issues the control command.

15. The system according to claim 13, wherein the global transmission period is determined independently by each unit based on a datum contained in the control command, which contains information regarding which control device initially issued the control command.

16. The system according to claim 9 wherein a calculation of the command transmission time, the individual waiting time, and the global transmission period, takes place in discrete time steps.

17. The method according to claim 1 wherein the system is a distributed lighting system and the units include lamps in a distributed arrangement and at least one switch.

18. The system according to claim 9 wherein the system is a distributed lighting system and the units include lamps in a distributed arrangement and at least one switch.

* * * * *